Jan. 26, 1965 L. H. GERHARDT 3,167,617

HANDSET RETAINING APPARATUS

Filed July 16, 1962 2 Sheets-Sheet 1

INVENTOR.
Leslie H. Gerhardt

BY
Paul J. Ethington
ATTORNEY

Jan. 26, 1965 L. H. GERHARDT 3,167,617

HANDSET RETAINING APPARATUS

Filed July 16, 1962 2 Sheets-Sheet 2

INVENTOR.
Leslie H. Gerhardt
BY
Paul J. Ethington
ATTORNEY

United States Patent Office 3,167,617

Patented Jan. 26, 1965

3,167,617
HANDSET RETAINING APPARATUS

Leslie H. Gerhardt, Wauwatosa, Wis., assignor to General Motors Corporation, Detroit, Mich., a corporation of Delaware Filed July 16, 1962, Ser. No. 209,919
7 Claims. (Cl. 179—100)

This invention relates to an apparatus for retaining a telephone handset in place on a telephone control head and more particularly to an improvement thereof for retaining the handset in place when the control head is mounted in any position.

Frequently, applications arise wherein a telephone handset must be securely retained in place on a telephone control head regardless of the latter's position whether it be vertical, horizontal or any intermediate position. Thus, handset retaining means are required and should provide the desired retention of the handset even during vibrations or maneuvering as, for example, may be encountered on an airplane, ship or the like. Also, it is desirable in such applications that the handset retaining means be operative to prevent retention of the handset in place on its associated control head when the former has not depressed a suitable operating plunger in the control head so as to actuate switching means therein to enable the telephone to receive incoming call signals.

In accordance with this invention, a telephone handset retaining apparatus is provided which will securely retain the handset in place on its associated control head when the latter is mounted in any position. This is accomplished with a pair of resilient support members mounted on a telephone control head. A pair of retaining members are provided each pivotally mounted to a different one of the support members. Resilient biasing means are provided connecting each of the support members with a different one of the retaining members so as to normally bias one end of each retaining member outwardly with respect to the other retaining member. Each of the transmitting and receiving units of the telephone handset has a cam surface which is directed inwardly toward the other unit and is adapted to cam against a different one of the retaining members. The distance between the pivot axes of the retaining members is greater than the distance between the came surfaces of the units whereby when the units are urged into engagement with the retaining members, the support members tend to retain the handset in place on the control head.

A more complete understanding of this invention may be had from the detailed description which follows taken with the accompanying drawings in which.

Figures 1, 2:
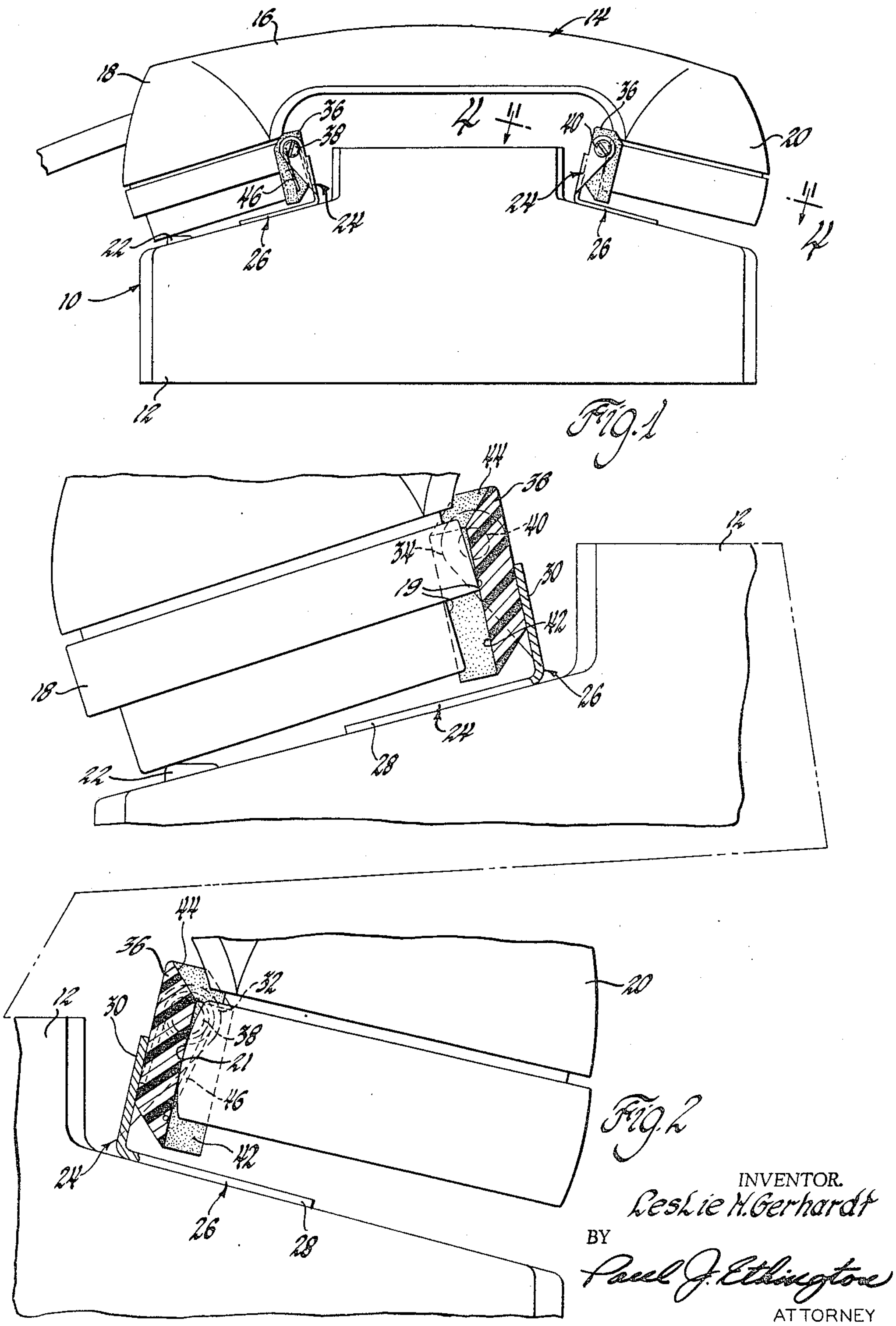
FIGURE 1 is a plan view showing one embodiment of the invention.
FIGURE 2 is a plan view partly in section illustrating the proper seating of a transmitter unit and a receiver unit with one embodiment of the retaining apparatus.

Referring now to the drawings, and more particularly to FIGURE 1, there is shown a telephone 10 comprising a control head 12 and a handset 14. The handset 14 comprises a handle 16 having a transmitting unit 18 and a receiving unit 20 on opposite ends thereof. An operating plunger 22 protrudes from the control head 12 and is operatively connected with suitable switching means therein (not shown) so that when the plunger 22 is depressed as shown in FIGURE 1 the switching means will be operative to permit the telephone 10 to receive incoming call signals. A pair of identical retaining clamps 24 are mounted on the control head 12 as shown in FIGURE 1 so as to retain the handset 14 in place on the control head 12.

Figures 3, 4, 5:
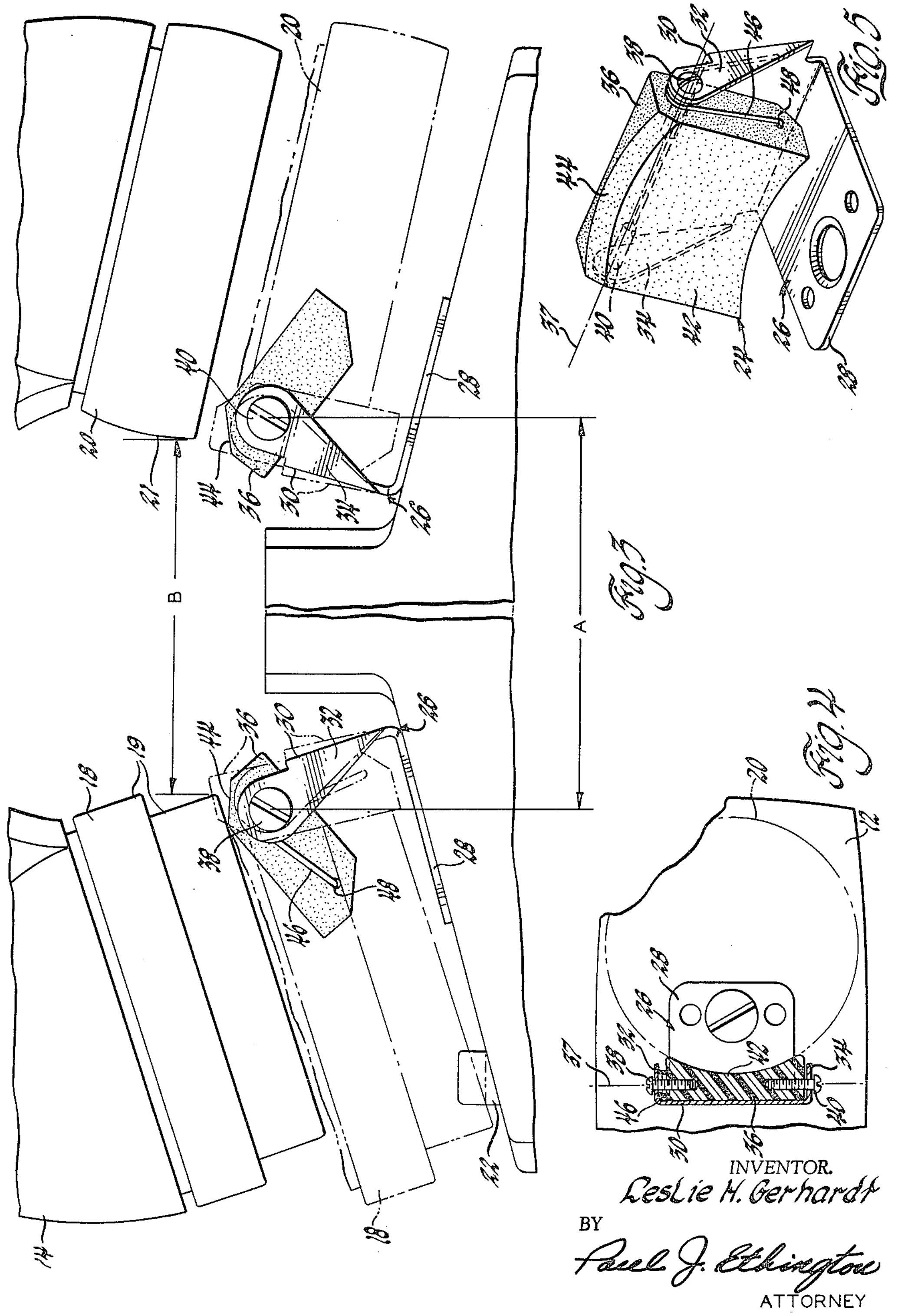
FIGURE 3 is a plan view illustrating the operation of the embodiment of the invention shown in FIGURE 1.
FIGURE 4 is a sectional view illustrating the retaining apparatus shown in FIGURE 1 and is taken along line 4—4 in FIGURE 1 looking in the direction of the arrows.
FIGURE 5 is a perspective view illustrating one retaining apparatus used in the embodiment of the invention shown in FIGURE 1.

The construction of each retaining clamp 24 may be more readily understood with reference to FIGURES 4 and 5. Each retaining clamp 24 comprises an L-shaped bracket 26 constructed of spring steel to provide resilience thereof. The bracket 26 includes a back plate 30 and a base plate 28, which may be securely mounted by suitable means to the control head 12 as shown in FIGURE 1. The back plate 30 is provided with a pair of wing portions 32 and 34 protruding therefrom. A retaining member 36 constructed of molded plastic such as acrylonitride butadene is pivotally mounted at one end thereof to the wing portions 32 and 34 with pivot posts 38 and 40, respectively. The pivot posts 38 and 40 define a pivot axis 37, as shown in FIGURE 5. The retaining member 36 is provided with a concave surface 42 having a contour adapted to frictionally engage at least a portion of either the transmitting unit 18 or the receiving unit 20. The retaining member 36 is canted at its pivoted end as shown in FIGURE 5 so as to provide a cam surface 44. A hairpin spring 46 constructed of music wire is wrapped about the pivot post 38 with approximately one and a third turns. One end of the spring 46 frictionally engages the inner side of the back plate 30 and the other end is bent and retained in a suitable hole 48 in the retaining member 36 as shown in FIGURE 5. The springs 46 act to normally urge the lower ends of the retaining members 36 outwardly as shown by the solid lines in FIGURE 3. The back plate 30 acts as a stop to limit angular displacements of the retaining members 36 about the pivot posts 38 and 40.

The handset clamps 24 are preferably mounted on the control head 12 with the pivot axes 37 in parallel relationship to each other and when the brackets 26 are not deflected as shown by the solid lines in FIGURE 3, the distance A between the pivot axes 37 of retaining members 36 is greater than the distance B between inwardly directed surfaces 19 and 21 of the transmitting unit 18 and receiving unit 20, respectively. The inwardly directed surfaces 19 and 21 also serve as cam surfaces for camming against the cam surface 44 of each retaining member 36 in the manner as described in the description of operation which follows:

The operation of the handset retaining apparatus may be more readily understood with reference to FIGURES 2 and 3. The solid lines in FIGURE 3 represent the undeflected position of the brackets 26 and the dotted lines represent the deflected position of the brackets 26 when the handset 14 is properly seated in place on the control head 12. As the operator urges the handset 14 into place on the control head 12 the cam surfaces 19 and 21 of the transmitter unit 18 and the receiver unit 20, respectively, will cam against the cam surfaces 44 of the associated retaining members 36. The retaining member 36 to the left in FIGURE 3 will pivot counterclockwise about its pivot axis 37 and the retaining member 36 to the right will pivot clockwise about its pivot axis 37. As the operator further urges the handset 14 into place the back plates 30 of the brackets 26 will initially deflect inwardly toward each other. As the points of contact between both the cam surfaces 19 and 21 and the respective concave surface 42 of the associated retaining member 36 become between the pivot axes 37 and the control head 12, the back plates 30 of the brackets 26 will deflect outwardly with respect to each other urging the retaining members 36 against the cam surfaces 19 and 21 of the units 18 and 20, respectively, so as to retain the handset 14 in place on the control head 12. With the handset 14 properly positioned on the control head 12, as shown in FIGURES 2 and 3, the plunger 22 will be depressed actuating suitable switching means (not shown) within the control head 12 so as to permit the telephone 10 to receive incoming call signals.

It is readily apparent from FIGURES 2 and 3 that, when the handset 14 is properly positioned on the control head 12, the vector representations of the retaining forces exerted by the brackets 26 on the handset 14 are directed outwardly toward the cam surfaces 19 and 21 of the transmitter unit 18 and receiver unit 20, respectively, and downwardly toward the control head 12. The retaining forces are sufficinet to overcome any forces exerted by the hairpin springs 46 tending to eject the handset 12 from the control head 14. However, if the operator fails to urge both cam surfaces 19 and 21 of the transmitter unit 18 and receiving unit 20 beyond the pivot axes 37 toward the control head 12, the forces exerted by the hairpin springs 46 urging the lower portions of the retaining members 36 outwardly will be sufficient to prevent proper seating of the handset 14 on the control head 12. Hence the plunger 22 will not be depressed and the handset 14 will be displaced from the control head 12. While in some applications the control head may be mounted in a horizontal position with the clamps 24 protruding upwardly therefrom, if the handset 14 is improperly positioned on the control head 12 as just described, it is apparent that with only slight vibrations the handset 14 will be displaced from the control head 12.

With the control head 12 mounted in a vertical position, such as a wall, the operator might attempt to hang the handset 14 to the control head 12, for example, by hooking the receiver unit 20 to one of the clamps 24. The forces exerted by the hairpin spring 46 urging the non-pivoted end of the retaining member 36 outwardly, and in this case upwardly, from the control head 12 will be sufficient to prevent such hooking action and hence the handset 14 from being hung by one unit to the control head 12.

Although the description of this invention has been given with respect to a particular embodiment, it is not to be construed in a limiting sense. Numerous variations and modifications within the spirit and scope of the invention will now occur to those skilled in the art. For a definition of the invention, reference is made to the appended claims.

I claim:

1. Apparatus for retaining a telephone handset in place on a telephone control head comprising a telephone control head, a telephone handset having a handle with a transmitter unit and a receiving unit on opposite ends thereof, a pair of resilient support members mounted on the control head, a pair of retaining members each pivotally mounted to a different one of the support members, resilient biasing means connecting each of the support members with a different one of the retaining members so as to normally bias one end of each retaining member outwardly with respect to the other retaining member, each unit having a cam surface directed inwardly toward the other unit and adapted to cam against a different one of the retaining members, the distance between the pivot axes of the retaining members being greater than the distance between the cam surfaces of the units when the support members are not deflected whereby upon urging of the units into engagement with the retaining members the cam surfaces of the former cam against the latter initially deflecting said support members inwardly toward each other and as the cam surfaces of both units are depressed beyond the pivot axes of the retaining members the support members return to the non-deflected position urging the retaining members against the cam surfaces of the units so as to retain the handset in place on the control head.

2. Apparatus for retaining a telephone handset in place on a telephone control head comprising a telephone control head, a telephone handset having a handle with a transmitter unit and a receiving unit on opposite ends thereof, a pair of resilient support members mounted on the control head, a pair of retaining members each pivotally mounted at one end to a different one of the support members, spring biasing means connecting each of the support members with a different one of the retaining members so as to normally bias the other end of each retaining member outwardly with respect to the other retaining member, each unit having a cam surface directed inwardly toward the other unit and adapted to cam against a different one of the retaining members, the distance between the pivot axes of the retaining members being greater than the distance between the cam surfaces of the units when the support members are not deflected whereby when the handset is urged into place on the control head the forces exerted by the support members on the units will tend to retain the handset in place on the control head, the forces exerted by the spring biasing means on each retaining member tend to eject the handset from the control head when the cam surfaces of both units are not depressed toward the control head beyond the pivot axes of the retaining members, the point of contact between the cam surface of each unit and the retaining member in engagement therewith being between the pivot axis of the retaining member and the control head when the handset is in place on the control head so that the forces exerted by the resilient support members on the units tending to retain the handset in place on the control head will be greater than those exerted thereon by the spring biasing means tending to eject the handset from the control head so as to retain the handset in place on the control head.

3. Apparatus for retaining a telephone handset in place on a telephone control head comprising a telephone control head, a telephone handset having a handle with a transmitter unit and a receiving unit on opposite ends thereof, first and second spring support members mounted on the control head, first and second retaining members pivotally mounted at one end to the first and second support members, respectively, spring biasing means connecting the retaining members with the support members whereby the other end of each retaining member is biased outwardly with respect to the other retaining member, each retaining member having a canted surface at its pivoted end, each unit having a cam surface directed inwardly toward the other unit and adapted to cam against the canted surface of a different one of the retaining members, the distance between the pivot axes of the retaining members when the spring support members are not deflected being greater than the distance between the cam surfaces of the units whereby when the handset is urged into place on the control head the forces exerted by the support members on the units will tend to retain the handset in place on the control head, the forces exerted by the spring biasing means on each retaining member tend to eject the handset from the control head when the cam surface of both units are not depressed toward the control head beyond the pivot axes of the retaining members, the point of contact between the cam surface of each unit and the retaining member in engagement therewith being between the pivot axis of the retaining member and the control head when the handset is in place on the control head so that the forces exerted by the spring support members on the units tending to retain the handset in place on the control head will be greater than those exerted thereon by the spring biasing means tending to eject the handset from the control head so as to retain the handset in place on the control head.

4. Apparatus for retaining a telephone handset in place on a telephone control head comprising a telephone control head, a telephone handset having a handle with a transmitter unit and a receiving unit on opposite ends thereof, first and second support members mounted on the control head, first and second retaining members pivotally mounted at one end to the first and second support members, respectively, the pivot axis of the first retaining member being parallel to the pivot axis of the second retaining member, spring biasing means connecting the retaining members with the support members whereby the other end of each retaining member is biased outwardly with respect to the other retaining member, a stop on each support member for limiting the extent to which the retaining members are biased outwardly, each retaining member having a canted surface at its pivoted end, each unit having a cam surface directed inwardly toward the other unit and adapted to cam against the canted surface of a different one of the retaining members, the distance between the pivot axes of the retaining members when the spring support members are not deflected being greater than the distance between the cam surfaces of the units whereby when the handset is urged into place on the control head the forces exerted by the support members on the units will tend to retain the handset in place on the control head, the forces exerted by the spring biasing means on each retaining member tend to eject the handset from the control head when the cam surfaces of both units are not depressed toward the control head beyond the pivot axes of the retaining members, the point of contact between the cam surface of each unit and the retaining member in engagement therewith being between the pivot axis of the retaining member and the control head when the handset is in place on the control head so that the forces exerted by the spring support members on the units tending to retain the handset in place on the control head will be greater than those exerted thereon by the spring biasing means tending to eject the handset from the control head so as to retain the handset in place on the control head, and a plunger mounted within the control head and protruding therefrom so that when the handset is positioned in place on the control head one of the units will cam against the plunger causing the plunger to be depressed into the control head.

5. A telephone instrument comprising a handset, a control head, a pair of resilient support members mounted on said control head, a retaining member pivotally mounted on each of said support members, resilient biasing means normally yieldingly urging said retaining members away from said support members, movement of said handset from a released to a retained position causing deflection of said support members toward each other and pivoting of said retaining members toward said support members whereby said handset is releasably maintained in said retained position.

6. In a telephone instrument including a control head and a handset, apparatus for releasably maintaining said handset in a retained position on said control head, said apparatus comprising a pair of resilient brackets mounted in spaced relationship on said control head, a retaining member pivotally mounted on each of said brackets, spring means normally yieldingly urging said retaining members away from said brackets, said handset including surfaces adapted to engage said retaining members causing pivoting thereof and deflection of said brackets during movement from a released position to a retained position.

7. In a telephone instrument including a control head and a handset, apparatus for releasably maintaining said handset in a retained position on said control head, said apparatus comprising a pair of handset retaining clamps, each of said clamps including a yieldable bracket mounted on said control head in spaced apart relationship and a retaining member pivotally supported thereon, spring members normally yieldingly urging said retaining member away from said bracket, each of said retaining members including a cam surface and a concave surface, said brackets having a normal position and a deflected position, said handset adapted to engage said cam surfaces in moving from a released position to said retained position thereby pivoting said retaining members and deflecting said brackets initially to said deflected position with said brackets returning to said normal position when said handset is in said retained position with said concave surfaces in engagement with said handset.

No references cited.